Figure 2:
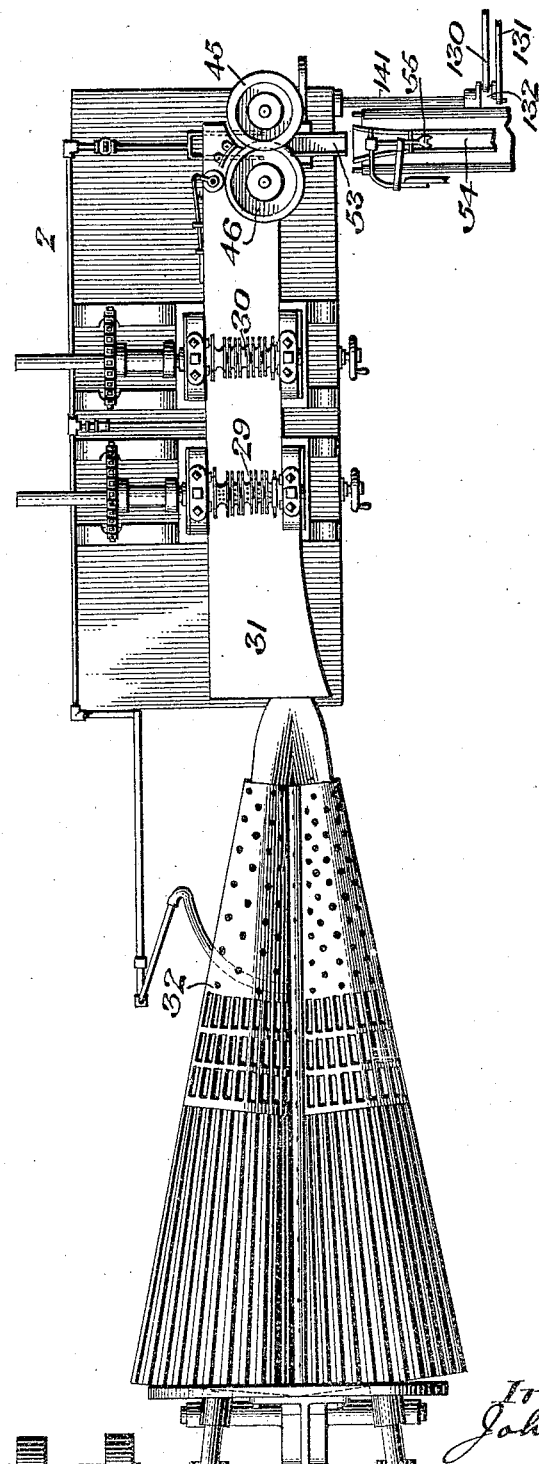

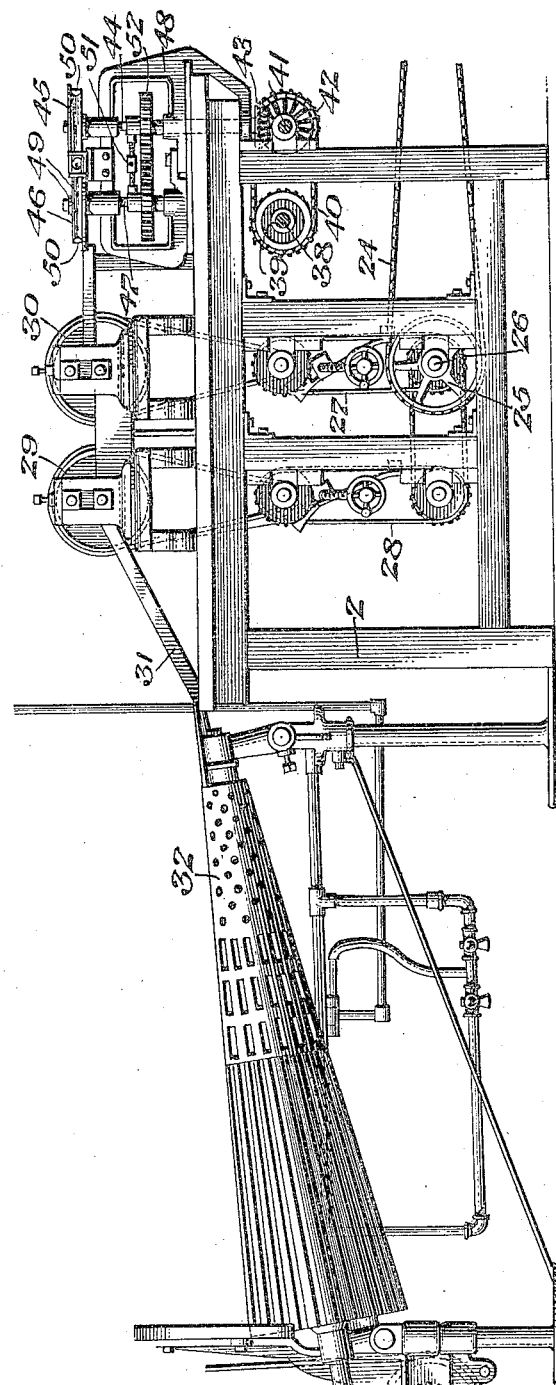

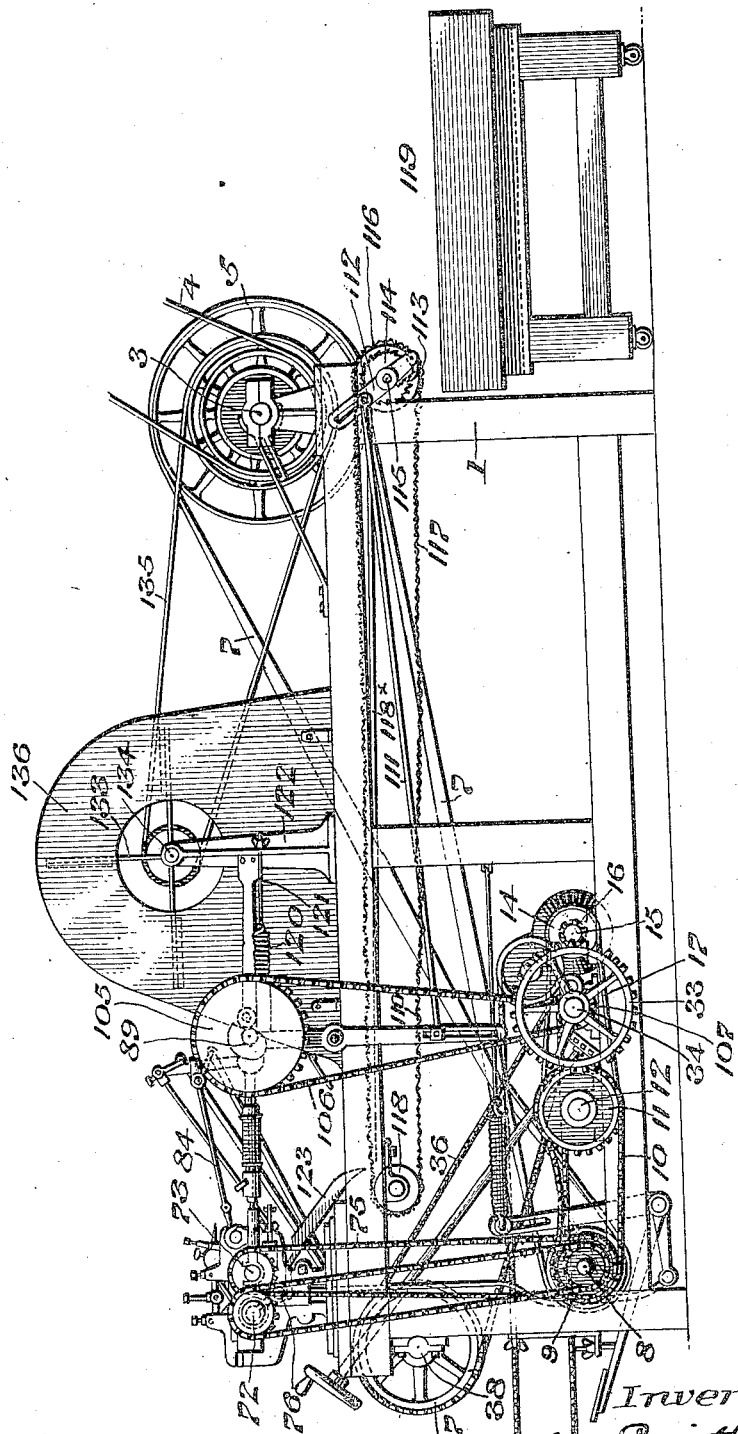

J. SMITH.
CANDY MACHINE.
APPLICATION FILED JULY 7, 1909.

942,595.

Patented Dec. 7, 1909.
6 SHEETS—SHEET 3.

Witnesses
O. F. Nagle
L. Onville.

Inventor
John Smith
by
Niedersheim Van Dauke
Attorneys

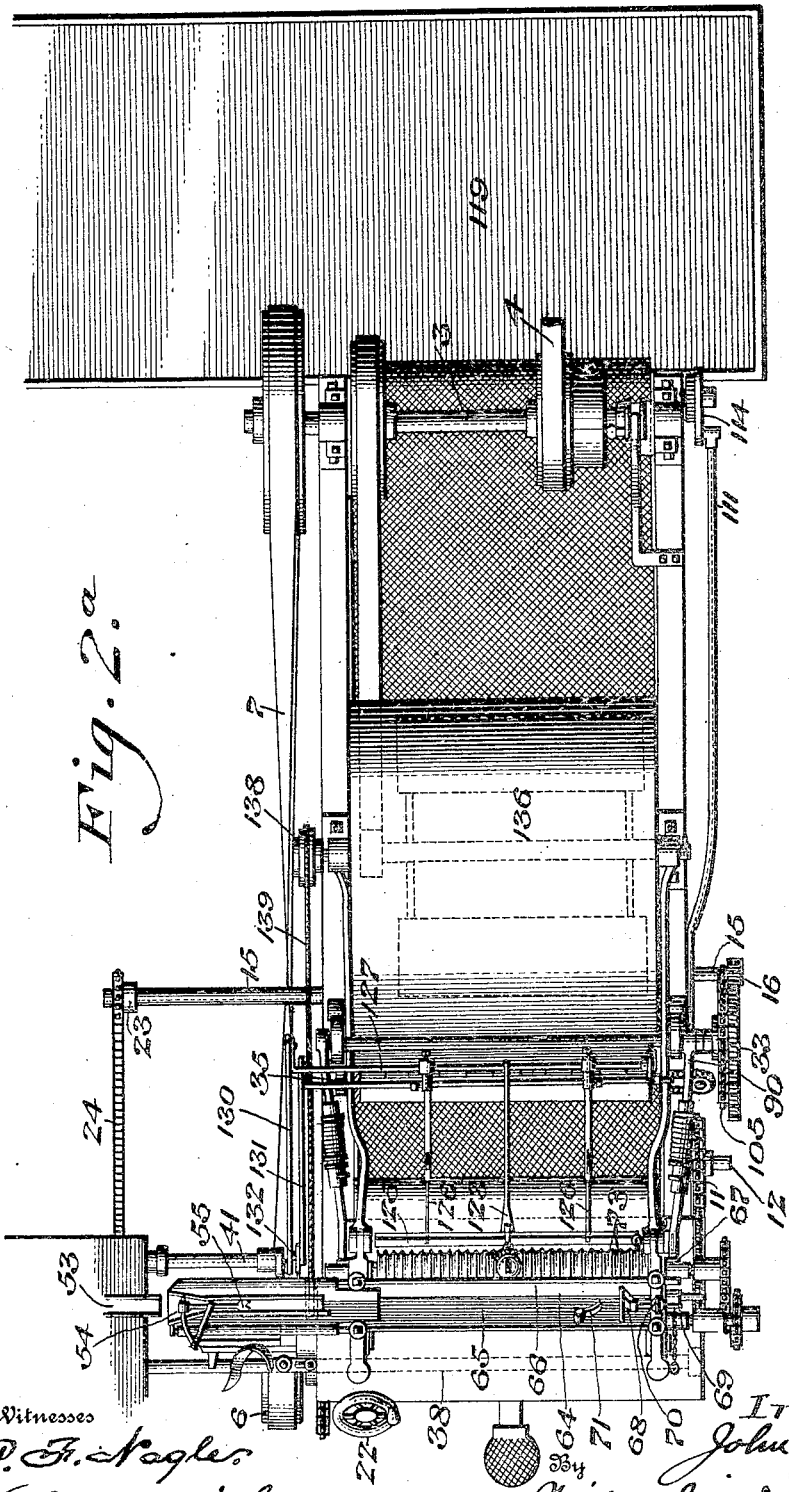

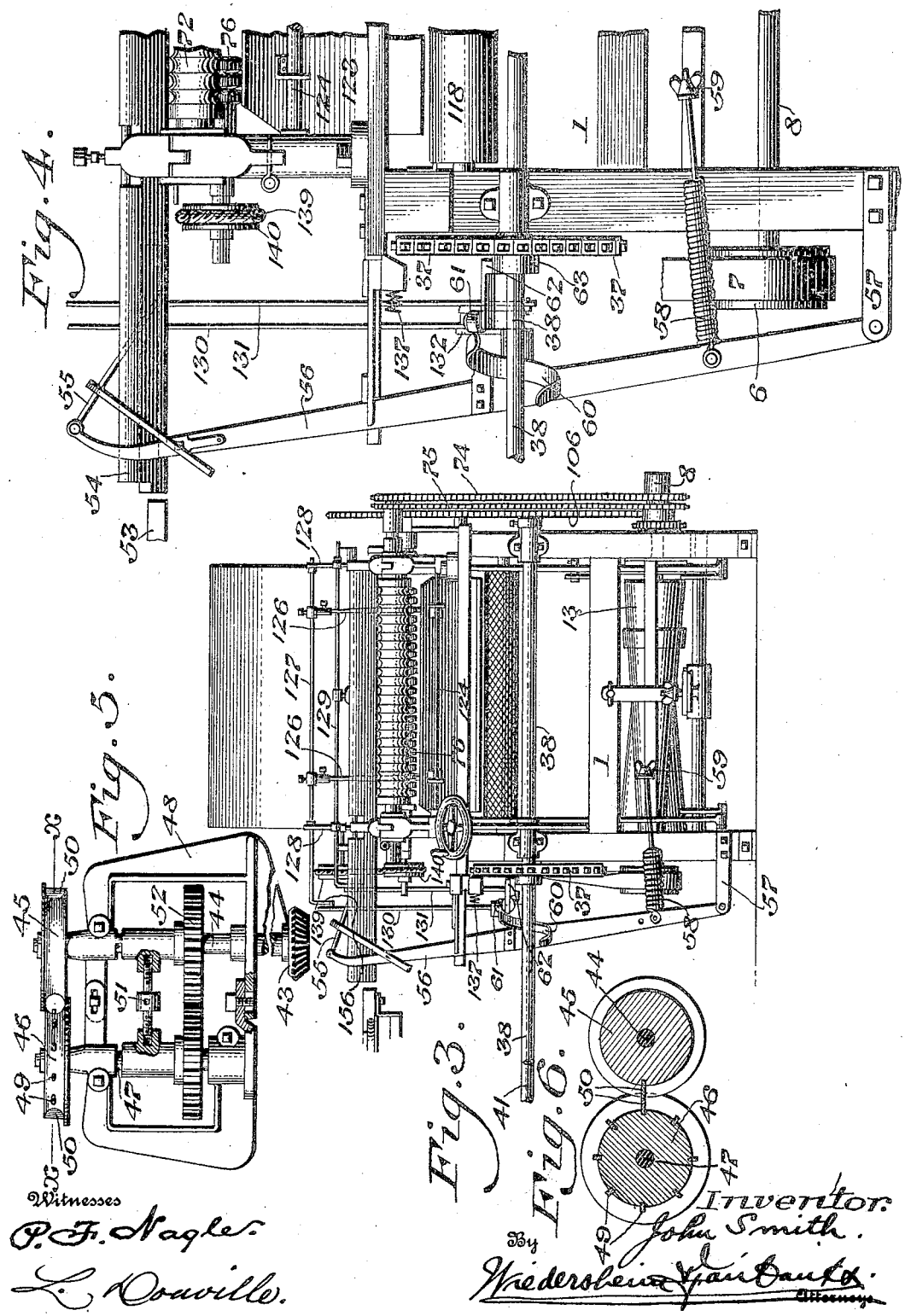

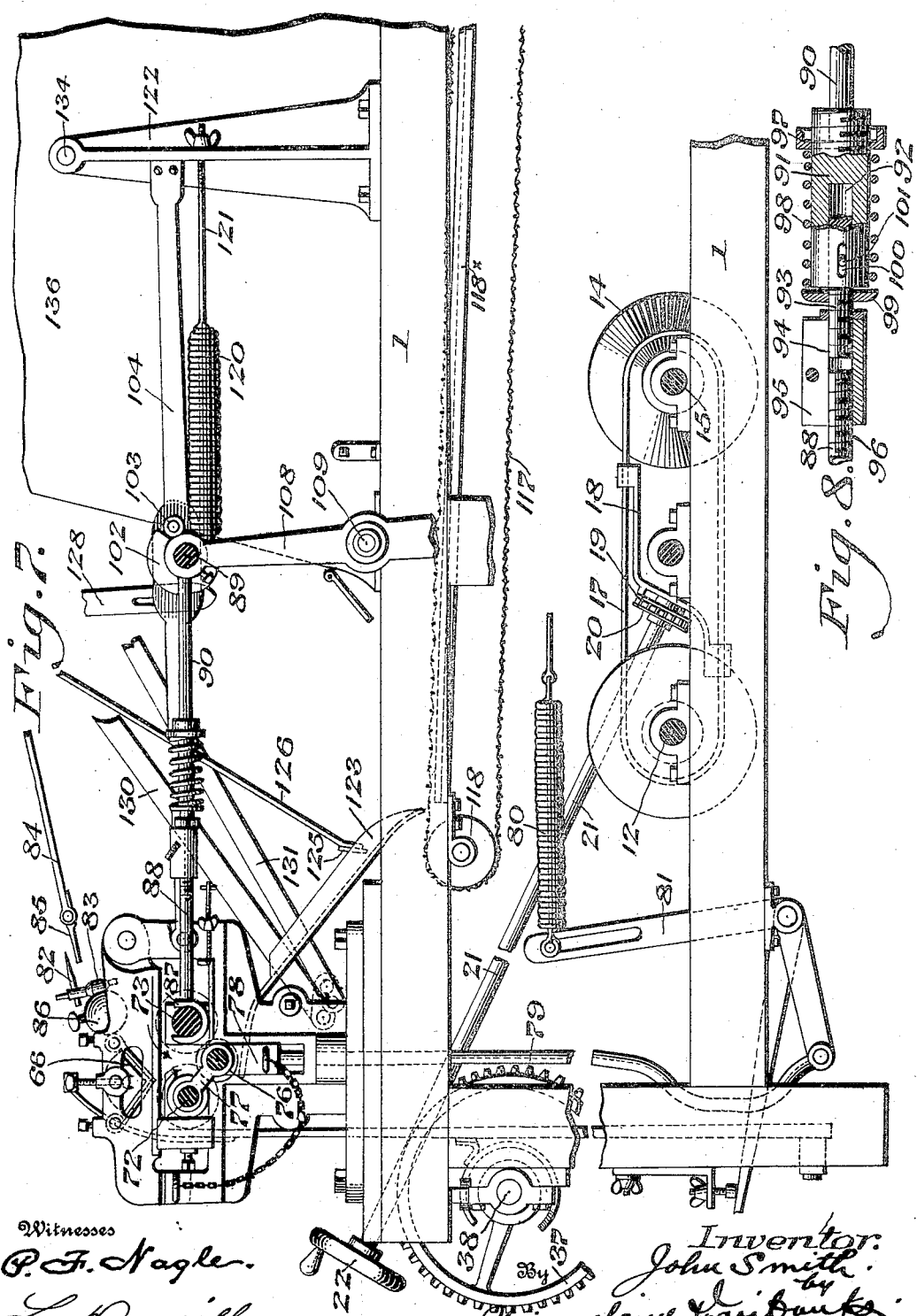

ated upon the frame of which is suit-

UNITED STATES PATENT OFFICE.

JOHN SMITH, OF PHILADELPHIA, PENNSYLVANIA, ASSIGNOR OF ONE-HALF TO HENRY BRANDLE, OF PHILADELPHIA, PENNSYLVANIA.

CANDY-MACHINE.

942,595.     Specification of Letters Patent.     Patented Dec. 7, 1909.

Application filed July 7, 1909. Serial No. 506,273.

*To all whom it may concern:*

Be it known that I, JOHN SMITH, a citizen of the United States, residing in the city and county of Philadelphia, State of Pennsylvania, have invented a new and useful Candy-Machine, of which the following is a specification.

This invention relates to candy machines and more particularly to the type for cutting and working the candy into various shapes and sizes and has for an object to provide a machine which automatically feeds and handles the material from the massed state to the finished article without the attention of an operator, each step being performed at the required time and the entire cycle of operation being a continuous one, whereby the finished articles are delivered uniform in shape and size and of a definite number to the pound.

In candy machines as heretofore constructed, it has been proposed to roll and manipulate a mass of candy, forming it into various shapes by manual control of the shaping mechanism and it has been found in practice that it requires highly skilled employees to produce various shaped candy articles with any degree of uniformity and furthermore there is a wide variation in the number of pieces to the pound.

In my present invention, having once adjusted the machine the massed candy is fed directly into the operating mechanism, passing through a series of steps including cutting, rolling and shaping, after which it is delivered to a suitable collecting receptacle or the like and the number of pieces to the pound will be substantially exact, as calculated.

It further consists of other novel features of construction, all as will be hereinafter fully set forth.

For the purpose of illustrating my invention I have shown in the accompanying drawing one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figures 1 and 1ª represent side elevations of a candy machine embodying my invention, it being apparent that when the two sheets of drawings are placed end to end, the entire machine is shown. Figs. 2 and 2ª are plan views of the same. Fig. 3 represents an end view of the same machine. Fig. 4 represents an enlarged detail of a portion of Fig. 3. Fig. 5 represents a detail of a portion of the feeding mechanism. Fig. 6 represents a section on line $x$—$x$, Fig. 5. Fig. 7 represents an enlarged side elevation of a portion of the machine. Fig. 8 represents a detail of the shaping roller operating connections.

Similar numerals of reference indicate corresponding parts in the figures.

Referring to the drawings:—1 and 2 designate, respectively, supporting frames for the several parts of my novel candy making mechanism, upon the frame of which is suitably mounted a main driving shaft 3 receiving power from any suitable source, such as is transmitted by the belt 4, it being of course understood that suitable clutching mechanism is employed, whereby rotation of the shaft 3 may be controlled in order to start or stop the machine, as required.

5 designates a pulley fixedly mounted on the shaft 3 for rotation therewith and adapted to transmit motion to a pulley 6 by means of a belt 7, the said pulley 6 being suitably mounted upon a supplementary main shaft 8, which controls suitable operating mechanism, presently to be described.

9 designates a sprocket wheel suitably secured on the shaft 8 and carrying thereon a chain 10 adapted to coöperate with a second sprocket wheel 11 fixedly mounted on a counter-shaft 12 suitably mounted for rotation in the frame 1. This counter-shaft 12 has mounted thereon, in the present instance, a cone pulley 13, adjacent to which is a second cone pulley 14 mounted on shaft 15, which latter carries also a pinion 16 for coöperation with parts presently to be described. The cone pulleys 13 and 14 serve as a means for regulating the speed of the machine and adjusting the several parts for any desired rotation, it of course being understood that a belt 17 connects the two pulleys in order to transmit motion from one to the other. As here shown, the belt 17 is engaged by a shifting member 18 secured to a chain 19 suitably mounted upon the frame 1 for movement transversely relative to the belt 17, the said movement being controlled by a sprocket wheel 20 mounted on a spindle 21 having a handle 22 to control the movement thereof. It will of course be apparent that as the handle 22 is rotated the wheel 20 will also be turned, thus communicating movement to the chain 19 and moving the shifting member 18 to draw the belt to a different position upon the counter-pulleys and thereby vary the speed of the parts controlled thereby.

It will be noted that the shaft 15 projects some distance at one side of the frame 1 and carries thereon a sprocket 23 with which a chain 24 engages and also passes around a sprocket 25 mounted upon the shaft 26 suitably journaled in the frame 2. This shaft 26 controls, in the present instance, a portion of the feeding mechanism located upon the frame 2, motion being transmitted by suitable sprocket chains 27 and 28 and controlling the movement of the feed rollers 29 and 30. These feed rollers 29 and 30 are located adjacent the end of a guide trough 31, here shown as inclined and joining the delivery end of a pair of working rollers 32, but since this structure, working rollers 32, feed rollers 29 and driving mechanism have been shown in my previous application for patent, filed August 19, 1907, Serial No. 389,111 and described in detail, it is therefore thought unnecessary to do the same here.

33 designates a sprocket wheel meshing with the pinion 16 and mounted upon a shaft 34 extending transversely of the frame 1 and carrying thereon a sprocket wheel 35 adapted to drive, through the medium of a chain 36, a sprocket wheel 37 mounted upon a shaft 38, which latter extends preferably to the frame 2 and carries a sprocket wheel 39, coöperating with which is a chain 40, whereby a shaft 41 is rotated to operate a bevel gear 42 with which a similar bevel gear 43 meshes and rotates the shaft 44, upon which latter is carried a feed roller 45. 46 designates a second feed roller adjacent the roller 45, and mounted upon a spindle 47, both of said spindles 44 and 47 being suitably journaled in a frame 48 secured to the frame 2. It will be noted that as here shown, the rollers 45 and 46 have a substantially concave periphery, whereby the candy is given an initial drawing while the roller 46 has a plurality of spaced teeth 49 for causing the candy to travel between the two rollers.

50 designates a knife edge secured to each roller 45 and 46, the relation between the two blades being such that one revolution of the rollers brings the knife blades into coöperative position and as the rollers are sufficiently close together, the candy is cut by the blades 50 into predetermined lengths for delivery to the machine. Of course it will be apparent that rollers of different diameters may be employed and thereby the length of the material varied as desired or as occasion demands. It will also be apparent that this cutting operation has a tendency to separate the two rollers and cause wear in the journals of the supporting spindles and therefore I provide a means for taking up this lost motion, the same, in the present instance, consisting of a turn buckle member 51, which is adapted to draw the two spindles together, it being noted that suitable equalizing mechanism 52 is employed to distribute the strain of the cutting operation.

53 designates a delivery chute adjacent the two feed rollers 45 and 46 and positioned so as to deliver the candy to a guide trough 54, from which it is fed to the forming portions of the machine.

55 designates a feeding arm suitably mounted adjacent the trough 54 and in the present instance projecting therein a sufficient distance to engage the candy being fed thereinto. This arm 55 in the present instance (see Fig. 4) is suitably mounted upon a rocking bar 56 pivotally mounted upon an arm 57 on the frame 1 and is maintained in normal position by means of a suitable spring 58 secured thereto at one end and at the other to a fixed portion of the machine, it being noted that a suitable wing nut 59 is used in connection therewith in order that the tension of the spring may be adjusted. In order to produce the necessary rocking movement of this bar 56 I utilize, in the present construction, a cam 60 secured to the bar 56 and mounted so as to contact with a roller 61 suitably mounted upon a rotating portion of the machine, in the present instance, an extension 62 of the hub 63 of sprocket 37. It will be apparent that as the roller 61 is rotated about the shaft 38 it will contact with the cam face 60 and intermittently move the bar 56 outwardly, the return to normal position being effected by the spring 58, as already described. The coöperating parts are so adjusted that at the time a strip of candy enters the trough 54, the bar 56 will be moved in a direction to bring the feeding arm 55 to the end of its outward stroke and into contact with the incoming candy whereupon as soon as the spring 57 contracts the arm 55 will have a quick return and deliver the cut strip of candy to the hopper 64. This hopper 64 consists, in the present instance, of a V-shaped trough, one side 65 of which, as here shown, is stationary while the opposite side 66 is mounted on suitable supports 67 for oscillating movement, so that at predetermined times it swings away from the side 65 and opens the bottom of the hopper to allow the candy to fall through upon the shaping members to be hereinafter described.

In connection with the delivery of the candy to the hopper 64 it will be noted that a suitable stop member 68 is provided to limit the travel of the candy within the hopper and to prevent the end of the same projecting at the sides of the machine out of line of the working members, thereby wasting the material. This stop 68, as here shown, is mounted on a rod 69 passing through a suitable opening in the main frame of the machine and adjustment is permitted by a thumb screw 70, as will be readily seen.

71 designates a spring member here shown as secured to the side 65 and normally held adjacent the bottom of the hopper to form a retarding means for the candy and to prevent the same from striking the stop 68 with a blow which might cause fracture of the formed stick.

Adjacent the hopper 64 and preferably beneath and in substantial alinement with the same, are a pair of rolls 72 and 73 having a configuration adapted to form a certain shape of candy, such as a ball, oval, or other like shape, the said rolls being suitably driven by chains 74 and 75 from the main shaft 8, as will be apparent. In order to prevent the stick from working down between the two rolls 72 and 73 and falling out at the bottom at the wrong time, a third roll 76, preferably smaller, is employed and maintained fixedly in position by a connecting link 77 from roll 72 and coöperating also with a bearing 78 on each side mounted upon a rod 79, which is normally held in raised position through the medium of a spring 80 operating through a bell crank 81.

From Fig. 7 it will be apparent that as the candy is delivered through the hopper side 66, the stick of candy will be dropped between the series of rollers 72, 73 and 76, which are in constant rotation, and the same will be worked therein to a predetermined shape. In order to open the hopper 64 at the correct time a finger 82 is secured to an extension 83 on the side 66 and so positioned as to project into the path of movement of a trip 84 carried by another operating part of the machine. This trip 84 carries a pivot member 85 on the end thereof which as it engages the finger 82, raises the same, thus opening the side 66 while on the return movement the pivoted connection between the parts 84 and 85 permits the latter to move back and thereby return to normal position. The return of the hopper side 66 is made possible through the medium of a counter-weight 86, as will be readily apparent.

In order to discharge the candy from between the shaping rollers I have in the present instance mounted each roller 73 in a bearing 87 carried by a rod 88 connected to a shaft 89, the latter being mounted for rotary and intermittent oscillating movement. The connection of the rod 88 in the present instance consists of a rod 90 attached by a collar or the like to the shaft 89 and having screw threaded engagement with a head 91 having a bore 92 with which a stem 93 coöperates for sliding movement. This stem 93 is provided in the present instance with a right hand thread 94 for engagement with a bushing 95 provided with right and left internal threads, one of which coöperates with the thread 96 of the rod 88.

97 designates a collar having screw threaded engagement with the head 91 and serving as an adjustable abutment for a spring 98 bearing at one end against a fixed collar 99 on the stem 93. In order to allow of the spring take-up after the roll 73 has come into engagement with the material, a slot 100 is formed on the head 91 and forms a guide for a pin 101 secured to the stem 93, whereby a lost motion connection is formed between the two parts. It will be seen that movement of the rod 90 will act through the spring 98 to shift the rod 88 and move the roll 73 into operating position and as soon as this has taken place the resistance to the movement of the rod 88 is such that the tension of the spring 98 is overcome and the slot 100 and pin connection 101 permit the head to move relative to the adjacent parts and compress the spring allowing a yielding of the roll 73. The shaft 89 has on each end a cam 102 fixedly mounted, by which oscillation of the shaft is permitted at suitable intervals through the engagement of each cam with a roller 103 mounted upon a strut 104 forming a stationary portion of the machine. It will thus be apparent as the cams 102 are rotated and engage the roller 103, that an oscillation of the shaft 89 will be produced and consequently the roll 73 be moved through the intervening connections. The rotation of the shaft 89 is accomplished through the medium of the sprocket wheel 105 receiving motion transmitted by a chain 106 passing over a sprocket wheel 107 fixedly mounted on shaft 34 driven by the sprocket wheel 33. The shifting of the shaft 89 is also utilized to shift a lever 108 pivoted at 109 to the frame 1, the said lever having an adjustable connection 110 with a rod 111 adjustably connected to an arm 112 carrying a pawl 113 for coöperation with a rotatable member 114 mounted on a shaft 115 adjacent the delivery end of the machine. This shaft 115 carries a roller 116 thereon, forming a support and guide for an apron 117 extending longitudinally of the machine and passing over a roller 118 suitably mounted on the frame 1. It will be apparent therefore that as the lever 108 is oscillated the pawl 113 will intermittently engage the ratchet 114 and produce a step by step movement of the apron 117, thus feeding the material throughout the length of the machine and delivering the same into a suitable receptacle 119. In connection with the movement of the shaft 89 and lever 108 it will be noted that the return to normal position is accomplished in the present instance by means of a spring 120 mounted upon a rod 121 secured to a bracket 122 mounted on the frame 1.

123 designates a delivery chute suitably mounted on a cross bar 124 (see Fig. 3) and in position to receive the article being rolled as it leaves the rolls and to direct the same downwardly upon the apron 117, it being noted that the chute 123 is so inclined as to permit the article to slide down easily into position. In order that the descent of the candy may not be too fast I provide a retarding device consisting in the present instance of a strip 125 extending substantially parallel to the chute and of approximately the same length and mounted upon a plurality of arms 126 mounted upon a rock shaft 127 suitably journaled in standards 128. These same standards 128 carry also a second rock shaft 129 upon which is mounted the trip arm 84. As here disclosed, these rock shafts receive motion through links 130 and 131 respectively, connected to a double crank 132 mounted upon an extension of the shaft 41. It will be understood that the candy as it leaves the chute 123 is in a more or less heated condition due to the contact with the hot rollers 32 and feed rollers 29 and 30 and it is therefore essential that some means be provided for cooling the same in its passage along the apron 117. For this purpose I provide a fan or blower 133 mounted upon a shaft 134 journaled in the brackets 122, the said shaft being driven by the belt 135 or the like from the main shaft 3. It will be noted that a suitable casing 136 is provided whereby the blast of air is directed downwardly upon the apron 117 and acts to reduce the temperature of the candy so that it is delivered to the receptacle 119 in a practically cold state.

In connection with the feed bar 55 attention is directed to a spring or buffer 137 which is positioned to receive and break the force of the return of the arm 56. The blower shaft 134 in the present instance is extended on one side sufficiently to permit the attachment of a pulley 138, coöperating with which is a rope drive or the like 139, passing over a pulley 140 secured to the shaft of roll 76 and by which the latter is rotated at the same speed as rolls 72 and 73.

In operation, a mass of candy to be worked and shaped is placed upon the cone rolls 32 where its consistency is maintained uniform through the medium of the heat supply to the rolls and an operator then draws the candy and directs it up the guide way 31 to the rollers 29 and 30, from which it passes and receives an initial drawing which reduces and delivers it to the feed roller 46. This roller through the medium of the teeth 49 and roller 45, feeds the candy to the guide ways 53 and 54 and when a definite predetermined length has passed therethrough the cutting blades 50 come opposite to each other and nearly sever the desired length, the small amount of material connecting the parts being instantly cooled, becomes brittle and when the feed bar 55 engages the candy and forces it into the hopper 65 the connecting portion is broken. The stick of candy entering the hopper with some velocity meets the holding member 71 and stop 68 so that it is properly positioned in the bottom of the hopper, at which time the trip arm 84 strikes the finger 82 and tips the side 66 so that the candy drops through upon the roll 76 in position to be engaged by the roll 73, which is advancing at this time through the movement of the cam 89 and yielding connections already described. The roll 73 after working the candy and forming it into the desired shape, is drawn back by springs 120 permitting the shaped stick of candy to drop upon the chute 123. During the passing of the candy in the chute 123 the strip 125 is describing a movement in the opposite direction and is brought sufficiently close to the chute to contact with and break the fall of the candy from the apron 117. It will of course be clear that this retardation is but momentary as the strip immediately passes over the candy and permits it to continue its descent and rest upon the said apron. As the candy is deposited upon the apron one strip behind the other, the apron travels along step by step beneath the blower 133 and the air acts as a cooling agent to bring the candy to the proper state when it reaches the end of the apron and drops into the receptacle for that purpose. In connection with the cooling action it will be noted that a plate 118$^x$ is positioned beneath and in comparatively close proximity to the apron 117, whereby a deflecting surface is provided adapted to throw the air back beneath the articles upon the apron 117, thus cooling the under side thereof as well as the top and making a complete and uniform cooling action.

It will be understood that for various kinds of material and the different shapes desired, the speed of the different parts must be adjusted in order to properly form the candy and for this purpose I find the cone speed control exceedingly efficient and advantageous as it will be apparent that by slight movement of the hand wheel 22 the belt 17 may be shifted in one direction or the other as desired and thereby produce a different speed for the control shaft 15. It will be seen that this shaft 15 controls the speed of the reciprocating roll 73, the trip arm 84, the retarding strip 125 and also the action of the feed bar 55, all of which are essential elements in the formation of the different varieties of candy formed by this machine.

In so far as I am aware I am the first in the art to produce a candy machine in which the material is delivered directly from a drawing and cutting mechanism to a shaping and finishing machine, the entire mechanism operating as a complete unitary device for the purpose intended and by means of which I am enabled to dispense with the constant attendance of a skilled operator and also by means of which the material is delivered in a finished state of uniform shape, size and weight ready for packing.

I am aware that it has heretofore been proposed in the patent to Snyder No. 347,971, Aug. 24, 1886, to employ a plurality of shaping rollers in combination with a hopper, the operation of the same being controlled, as are other portions of the device, by belts and pulleys, a construction which has been found to be impractical and inoperative for the purpose intended. It furthermore is open to the disadvantage of requiring constant attention and manipulation from the operator of the machine and the slipping belts and the like prevent the uniform shaping and molding of the candy. It is, however, the desideratum in the commercial manufacture of the devices, that unnecessary parts be reduced to a minimum and for proper operation, all movement be controlled in a positive manner and the operation of the machines be such that the most unskilled labor can readily understand and operate them.

It will now be apparent that I have devised a novel and useful construction which embodies the features of advantage enumerated as desirable in the statement of the invention and the above description and while I have in the present instance shown and described the preferred embodiment thereof which has been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. In a candy machine, a plurality of rolls for drawing candy, a plurality of feeding rollers adjacent thereto and provided with cutting means, a hopper suitably positioned with respect to said feed rolls, and means to deliver a strip of candy from said feed rolls to said hopper.

2. In a candy machine, a plurality of rolls for drawing candy, a plurality of feeding rollers adjacent thereto and provided with cutting means, a hopper suitably positioned with respect to said feed rolls, and a reciprocable arm adapted to engage and deliver a strip of candy from said feed rolls to said hopper.

3. In a candy machine, a plurality of rolls for drawing candy, a plurality of feeding rollers adjacent thereto and provided with cutting means, a hopper suitably positioned with respect to said feed rolls, a reciprocable arm adapted to engage and deliver a strip of candy from said feed rolls to said hopper, and guide means between said feed rolls and said hopper.

4. In a candy machine, a plurality of rolls for drawing candy, a plurality of feeding rollers adjacent thereto and provided with cutting means, a hopper suitably positioned with respect to said feed rolls, an arm mounted for reciprocating movement, a toothed member carried by said arm, and a cam movement suitably supported to shift said arm in one direction, and a spring to return the same, whereby a strip of candy is delivered to said hopper.

5. In a candy machine, a support, a hopper on said support, a cutting device adjacent said hopper, a reciprocable arm between said hopper and said cutting device for delivering a strip of candy to said hopper, and means to open said hopper at a predetermined time.

6. In a candy machine, a support, a hopper on said support, a cutting device adjacent said hopper, a reciprocable arm between said hopper and said cutting device for delivering a strip of candy to said hopper, a plurality of rotatable shaping rolls mounted beneath said hopper, and means to open said hopper at a predetermined time to deposit a strip of candy on said shaping rolls.

7. In a candy machine, a support, a hopper on said support, a cutting device adjacent said hopper, a reciprocable arm between said hopper and said cutting device for delivering a strip of candy to said hopper, a delivery chute adjacent said rolls, and means to retard the movement of a strip of candy on said delivery chute.

8. In a candy machine, a support, a hopper on said support, a cutting device adjacent said hopper, a reciprocable arm between said hopper and said cutting device for delivering a strip of candy to said hopper, a delivery chute adjacent said rolls, a strip adapted to move in close proximity to said chute to retard said candy in its movement along said chute, and means to oscillate said strip.

9. In a candy machine, a support, a hopper on said support, a cutting device adjacent said hopper, a reciprocable arm between said hopper and said cutting device for delivering a strip of candy to said hopper, a delivery chute adjacent said rolls, a conveyer mechanism adjacent the delivery end of said chute, and means to produce a step by step movement of said conveyer mechanism.

10. In a candy machine, a support, a hopper on said support, a cutting device adjacent said hopper, a reciprocable arm between said hopper and said cutting device for delivering a strip of candy to said hopper, a delivery chute adjacent said rolls, a conveyer mechanism adjacent the delivery end of said chute, means to produce a step by step movement of said conveyer mechanism, and a blower adapted to force air upon said conveyer mechanism.

11. In a candy machine, a hopper supported thereon having a movable side, a stop in said hopper to position a strip of candy therein, and means to adjust said stop.

12. In a candy machine, a hopper supported thereon, a stop on said hopper, and means to retard the movement of a piece of candy in its movement along said hopper.

13. In a candy machine, feeding and cutting mechanism, a hopper supported adjacent thereto, a guide means between said mechanism and said hopper, a plurality of shaping rolls beneath said hopper, and means to reciprocate one of said rolls at a predetermined time.

14. In a candy machine, a support, a hopper mounted thereon having a pivoted side to open said hopper, a plurality of shaping rolls beneath said hopper, a cutting mechanism, a feeding arm between said cutting mechanism and said hopper, a shaft connected to one of said shaping rolls, and means to oscillate said shaft to move said roll at a predetermined time.

15. In a candy machine, a support, a hopper mounted thereon having a pivoted side to open said hopper, a plurality of shaping rolls beneath said hopper, a cutting mechanism, a feeding arm between said cutting mechanism and said hopper, a shaft connected to one of said shaping rolls, means to operate said shaft to move said rolls at a predetermined time, and a lost motion connection between said shaft and said shaping roll.

16. In a candy machine, a support, a hopper mounted thereon having a pivoted side to open said hopper, a plurality of shaping rolls beneath said hopper, a cutting mechanism, a feeding arm between said cutting mechanism and said hopper, a shaft connected to one of said shaping rolls, means to oscillate said shaft to move said rolls at a predetermined time, driving mechanism for said shaft, and means to vary the speed of said driving mechanism.

JOHN SMITH.

Witnesses:
ROBERT M. BARR,
E. HAYWARD FAIRBANKS.